US008423784B2

(12) United States Patent
Akama

(10) Patent No.: US 8,423,784 B2
(45) Date of Patent: Apr. 16, 2013

(54) POSITION REGISTERING METHOD, PROGRAM AND APPARATUS FOR TERMINAL EQUIPMENT

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 757 days.

(21) Appl. No.: 10/716,397

(22) Filed: Nov. 20, 2003

(65) Prior Publication Data

US 2004/0103289 A1 May 27, 2004

(30) Foreign Application Priority Data

Nov. 21, 2002 (JP) ................. 2002-337482

(51) Int. Cl.
*H04K 1/00* (2006.01)

(52) U.S. Cl.
USPC .......... 713/186; 455/409; 455/435.2

(58) Field of Classification Search .......... 713/186; 455/409, 435.2
See application file for complete search history.

(56) References Cited

U.S. PATENT DOCUMENTS

| | | | | | |
|---|---|---|---|---|---|
| 5,297,189 | A | * | 3/1994 | Chabernaud | 455/461 |
| 5,631,947 | A | * | 5/1997 | Wittstein et al. | 379/114.17 |
| 5,784,442 | A | * | 7/1998 | Foti | 455/405 |
| 5,872,834 | A | * | 2/1999 | Teitelbaum | 379/93.03 |
| 5,943,620 | A | * | 8/1999 | Boltz et al. | 455/445 |
| 6,151,503 | A | * | 11/2000 | Chavez | 455/445 |
| 6,219,793 | B1 | * | 4/2001 | Li et al. | 726/19 |
| 6,377,699 | B1 | * | 4/2002 | Musgrave et al. | 382/117 |
| 6,765,470 | B2 | * | 7/2004 | Shinzaki | 340/5.52 |
| 6,778,828 | B1 | * | 8/2004 | Chander et al. | 455/435.1 |
| 6,892,074 | B2 | * | 5/2005 | Tarkiainen et al. | 455/466 |
| 6,941,129 | B2 | * | 9/2005 | Marce et al. | 455/414.1 |
| 7,177,642 | B2 | * | 2/2007 | Sanchez Herrero et al. | 455/435.1 |
| 7,251,731 | B2 | * | 7/2007 | Laniepce et al. | 713/176 |
| 2002/0060243 | A1 | * | 5/2002 | Janiak et al. | 235/382 |
| 2002/0087894 | A1 | * | 7/2002 | Foley et al. | 713/202 |

FOREIGN PATENT DOCUMENTS

| | | |
|---|---|---|
| WO | WO 98 24257 | 6/1998 |
| WO | WO 98 26626 | 6/1998 |
| WO | WO 01 18760 | 3/2001 |

OTHER PUBLICATIONS

McGinnis, Chris. "The Frequent Traveler: How to keep your phone working when in Europe" Published Jun. 7, 2002 (3 pages) http://www.travelskills.com/column/2002/06.07europhone.htm.*
Scourias, John. "A Brief Overview of GSM" © 1994 John Scourias. (14 pages) http://kbs.cs.tu-berlin.de/~jutta/gsm/js-intro.html.*
3GPP TS 29.228 v0.1.0 (Jun. 2001) Technical Specification http://www.3gpp.org/ftp/Specs/archive/29_series/29.228/29228-010.zip.*

(Continued)

*Primary Examiner* — Darren B Schwartz
*Assistant Examiner* — Thomas Gyorfi
(74) *Attorney, Agent, or Firm* — Staas & Halsey LLP

(57) ABSTRACT

Personal information is registered for each user by a personal information management unit, linking a subscribed terminal equipment number, terminal subscriber identification information and user charging identification information to biological information of a user possessing a mobile communication terminal equipment. When an authentication request receiving unit receives an authentication request containing user biological information and terminal subscriber identification information from the terminal equipment, a biological information authentication unit retrieves personal information having biological information matching the received biological information and changes terminal subscriber identification information in the personal information found into the received terminal subscriber identification information. A position registration proxy unit transfers the terminal subscriber identification information in the personal information found and the received terminal subscriber identification information to an exchange to request registration of position information which enables call out and reception as a terminal equipment having a subscribed terminal number.

5 Claims, 14 Drawing Sheets

OTHER PUBLICATIONS

3GPP TS 24.228 v1.0.0 (Apr. 2001) Technical Specification http://www.3gpp.org/ftp/Specs/archive/24_series/24.228/24228-100.zip.*

3GPP TS 23.002 v5.2.0 (Apr. 2001) Technical Specification http://www.3gpp.org/ftp/Specs/archive/23_series/23.002/23002-520.zip.*

3GPP TS 22.101 v4.0.0 (Apr. 2001) Technical Specification http://www.3gpp.org/ftp/Specs/archive/22_series/22.101/22101-400.zip.*

3GPP TS 23.228 v5.0.0 (Apr. 2001) Technical Specification http://www.3gpp.org/ftp/Specs/archive/23_series/23.228/23228-500.zip.*

M. Handley et al. "RFC2543: SIP: Session Initiation Protocol" Published Mar. 1999 (153 pages) http://www.faqs.org//ftp/rfc/pdf/rfc2543.txt.pdf.*

Lufrano, Sonny. "Biometriic security offers futuristic protection" Published Apr. 19, 2002 by the Atlanta Business Chronicle (6 pages) http://atlanta.bizjournals.com/atlanta/stories/2002/04/22/focus3.html.*

Salkever, Alex. "Security Blankets: One Layer Isn't Enough" Published Jun. 5, 2002 by Businessweek.com (3 pages) http://www.businessweek.com/technology/content/jun2002/tc2002065_8400.htm.*

Posting from Slashdot.org on the article "Smart Cards for Windows XP Login" Comment "Re: PIN" posted Dec. 3, 2001. http://ask.slashdot.org/comments.pl?sid=24411&cid=2648374.*

ETSI TS 129 228 V.5.0.0: Digital Cellular Telecommunications System (Phase 2+); Universal Mobile Telecommunications System (UMTS); IP Multimedia(IM) Subsystem Cx and Dx interfaces; Signalling flows and message contents (3GPP TS 29.228 version 5.0.0 Release 5). Published Jun. 2002 (47 pages).*

Rappaport, Theodore. "Wireless Communications Principles and Practices, Second Edition" Published Dec. 31, 2001 by Prentice Hall Inc. Excerpt from Chapter 11 (17 pages).*

Young, Deborah. "Vendors demonstrate CDMA/GSM roaming" Published Aug. 24, 2001 (2 pages) http://connectedplanetonline.com/wireless/news/wireless_vendors_demonstrate_cdmagsm/.*

"Nextel Offers International Travelers Two New Phones; With Motorola P280 and v60, Nextel Customers use iDEN technology in United States and GSM Abroad" Published May 1, 2002 (2 pages) http://goliath.ecnext.com/coms2/gi_0199-1628374/Nextel-Offers-International-Travelers-Two.html.*

GSM Cellulalr Phone FAQs from PlanetOmni.com. Published Feb. 11, 2002 as verified by the Internet Archive (2 pages) http://web.archive.org/web/20020211005459/http://www.planetomni.com/FAQ_gsm.shtml.*

Wilson Rothman. "Which Plan is Best for You?" Article published Jun. 3, 2002 (2 pages) http://www.time.com/time/magazine/article/0,9171,1002587,00.html.*

Uchida, K, "Fingerprint-based user-friendly interface and pocket-PID for mobile authentication", Pattern Recognition, 2000, Proceedings 15th International Conference on Sep. 3-7, 2000, Los Alamitos, CA, USA, IEEE Comput. Soc, US, pp. 205-209.

* cited by examiner

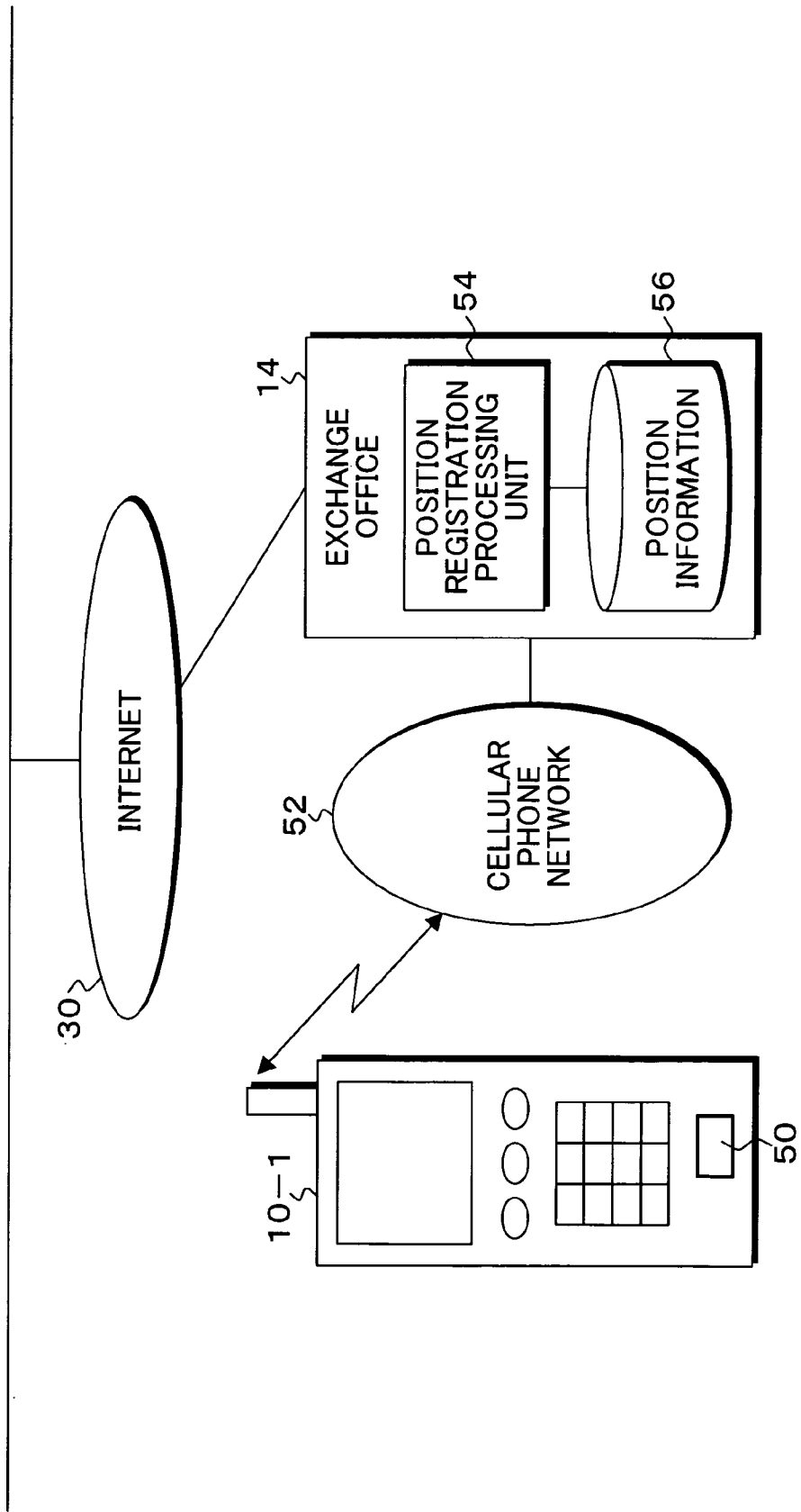

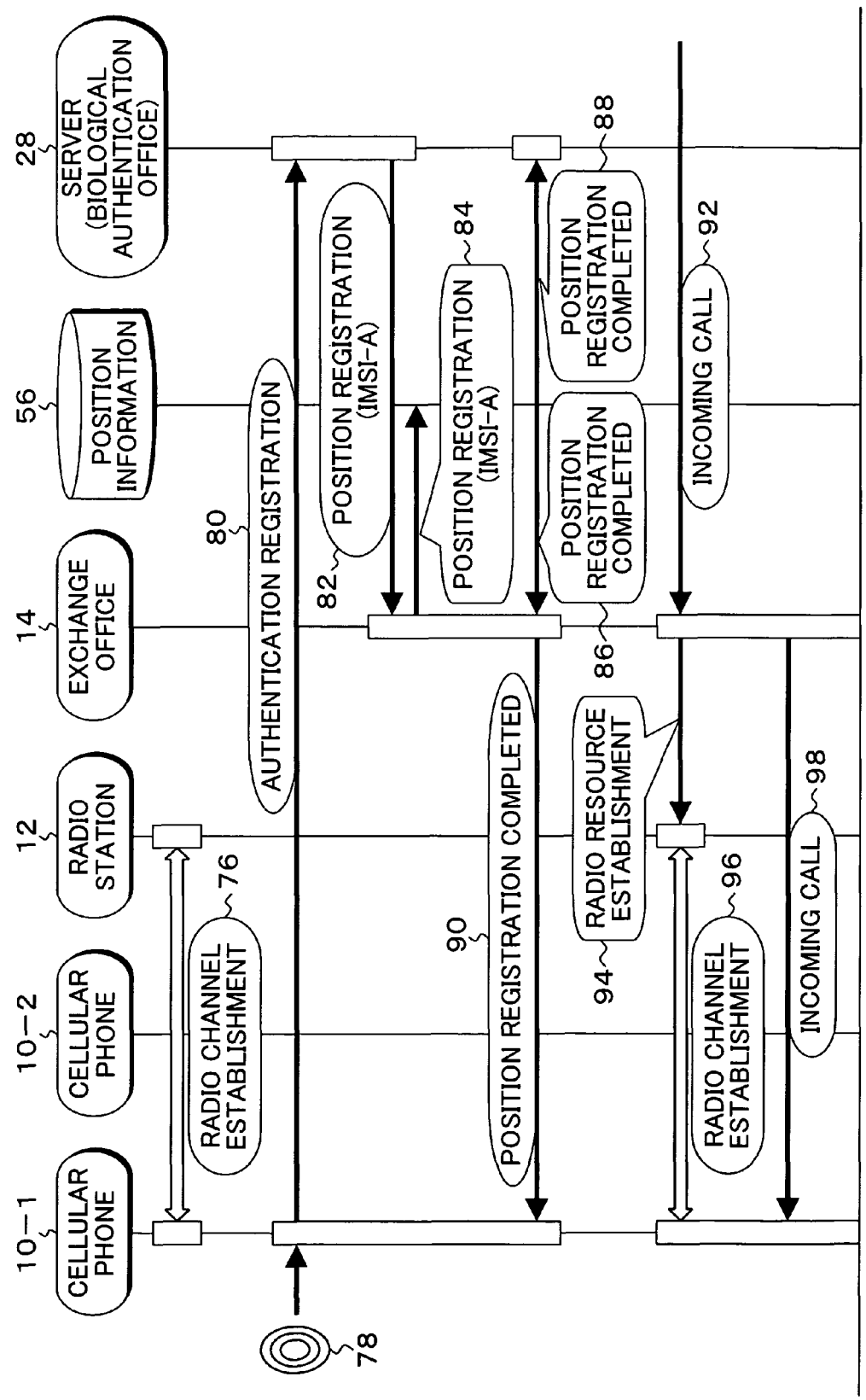

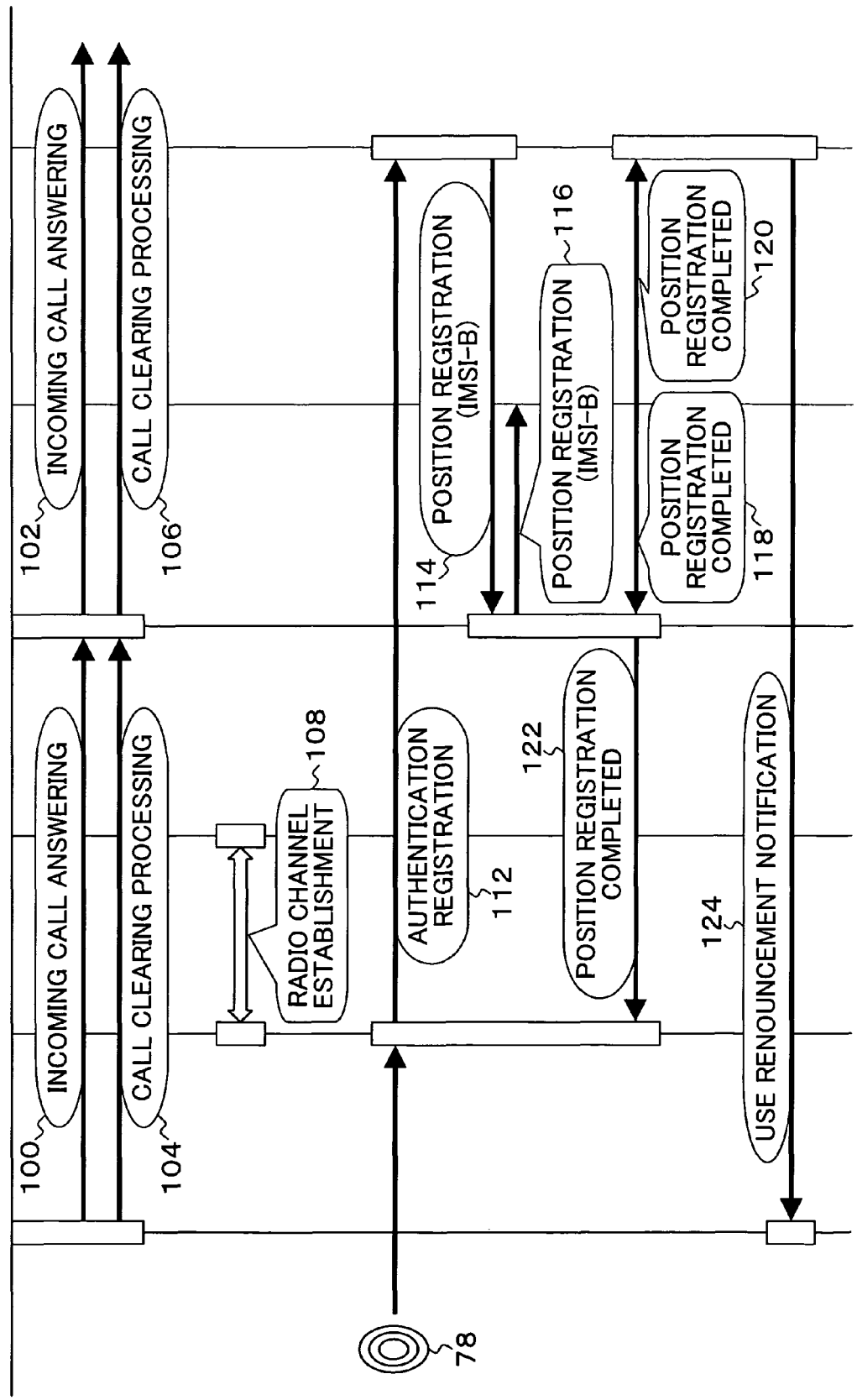

FIG. 11

| BIOLOGICAL INFORMATION | SUBSCRIBER TELEPHONE NUMBER | PERSONAL DATA | INTERNATIONAL CELLULAR PHONE SUBSCRIBER IDENTIFICATION NUMBER (IMSI) | CHARGED USER IDENTIFICATION NUMBER |
|---|---|---|---|---|
| A | aaaaaaa | | IMSI-A | AAAAA |
| B | bbbbbbb | | IMSI-B | AAAAA |
| C | ccccccc | | IMSI-C | AAAAA |
| D | ddddddd | | IMSI-D | AAAAA |

48

58-1, 58-2, 58-3, 58-4

POSITION REGISTERING METHOD, PROGRAM AND APPARATUS FOR TERMINAL EQUIPMENT

BACKGROUND OF THE INVENTION

1. Field of the Invention

The present invention relates generally to a method, program and apparatus for registering the position of a terminal equipment, which are used when a single user uses a plurality of mobile communication terminal equipments, and more particularly to a method, program and apparatus for registering the position of a terminal equipment, which utilize biological information (biometrics information) such as user's fingerprint image.

2. Description of the Related Arts

IC card transfer has traditionally been known as a position registration method used when a single user uses a plurality of cellular phones.

FIGS. 1A and 1B are explanatory diagrams showing the position registration procedure for GSM/WCDMA cellular phones.

The user communicates with a position registration based on an international mobile subscriber identity (IMSI) 310 stored in an IC card (SIM/USIM card) 308 to identify himself or herself.

If the same user has two cellular phones 300-1 and 300-2 and uses the new phone 300-2, he or she can use this phone as his or her cellular phone by removing the IC card 308 from the cellular phone 300-1 and inserts it into the cellular phone 300-2.

This can be described more specifically as follows. When the user uses the cellular phone 300-1 by inserting the IC card 308 into the phone, position registration with an exchange 304 is required. The position registration 304 is requested to the exchange 304 by sending the international mobile subscriber identification number (IMSI) 310 to the exchange 304 after a radio channel establishment 312 between the cellular phone 300-1 and a radio station 302. In response to the position registration request, the exchange 304 performs a position registration 316 of user position information, linking a user telephone number and the international mobile subscriber identification number (IMSI-A) of the cellular phone 300-1 to position information 306.

When registration of the user position information is complete, a position registration completion 318 is sent to the exchange 304 which then sends back a position registration completion 320 to the cellular phone 300-1, thus making the cellular phone 300-1 available for use.

For example, if the exchange 304 receives an incoming call for the phone number of the cellular phone 300-1, the office performs a radio resource establishment 324 with the radio station 302 by referencing the position information 306 and obtaining the international mobile subscriber identity (IMSI), performs a radio channel establishment 326 with the cellular phone 300-1 and calls up the cellular phone 300-1.

The originating side is notified of an incoming call acknowledge 330 of the cellular phone 300-1 by the exchange 304 as an incoming call acknowledge 332, thus allowing a speech channel to be established. When the cellular phone 300-1 issues a call clearing processing 334, the exchange 304 issues a call clearing processing 336 to the originating side, causing the call to be terminated.

If the same user wishes to use the cellular phone 300-2 borrowed at an event site or other location, he or she takes out the IC card 308 from the cellular phone 300-1 and inserts the card into the cellular phone 300-2. The user performs a radio channel establishment 340 between the cellular phone 300-2 and the radio station 302 first and then sends the international mobile subscriber identification number (IMSI) 310 to the exchange 304 to request a position registration 342 as was done previously.

In response to the position registration request, the exchange 304 performs a position registration 344 which changes registration of user position information linking the user telephone number and the international mobile subscriber identification number (IMSI-A) of the cellular phone 300-1 into that of user position information linking the user telephone number and the international mobile subscriber identification number (IMSI-A) of the cellular phone 300-2.

When registration of user position information is complete, a position registration completion 346 is sent to the exchange 304 which then sends back a position registration completion 348 to the cellular phone 300-2, thus making the cellular phone 300-2 available for use.

This borrowed cellular phone 300-2 originates and receives calls at a different telephone number rather than the telephone number of the cellular phone 300-1 normally used by the user.

[Patent Document 1]
Japanese Patent Application Laid-open (Kokai) Pub. No. 2001-29078

[Patent Document 2]
Japanese Patent Application Laid-open (Kokai) Pub. No. 2002-044727

However, such a traditional position registration method employed when a single user uses a plurality of cellular phones presents the following problems:

First, the IC card must be transferred from an old cellular phone to a new one, requiring time and effort unless the user is accustomed to doing so. Additionally, some users may not be able to transfer the IC card.

When the user uses a borrowed cellular phone, he or she must register for call transfer or other service—a burdensome task—if the user wishes to receive calls for his or her usual phone with the borrowed one.

If the receiving side is coordinated with a phonebook based on cellular phone numbers, the party on the receiving side may reject a call from the borrowed phone because the call is made from an unknown person.

Further, since user information is stored on the IC card, if the cellular phone is put in the hands of a third party with the IC card left in the phone, the user cannot use personal information and personal information may be read by the third party.

SUMMARY OF THE INVENTION

It is therefore an object of the present invention to provide a terminal equipment position registration method, a registration program and a registration apparatus which make a cellular phone available for use as one's own phone through simple operations and reliably prevent personal information leaks.

According to a first aspect of the present invention there is provided a method of registering the position of a terminal equipment by a server, comprising:

a personal information managing step, by a personal information management unit, of registering personal information for each user, the personal information linking a subscribed terminal number, a terminal subscriber identification number and user charging identification information to biological information of a user possessing the terminal equipment;

an authentication request receiving step, by an authentication request receiving unit, of receiving from the terminal equipment an authentication request containing the user biological information and the terminal subscriber identification information;

a biological information authentication step, by a biological information authentication unit, of retrieving personal information having biological information matching the received biological information and of changing terminal subscriber identification information in the retrieved personal information into the received terminal subscriber identification information; and a position registration proxy step, by a position registration proxy unit, of transferring the subscribed terminal number in the personal information retrieved and the received terminal subscriber identification information to an exchange and of requesting position information registration which enables call in and call out as a terminal equipment having the subscribed terminal number.

Taking, as an example of a terminal equipment, a cellular phone for the description of the present invention, the cellular phone sends loaded biological information to a server, identifies a user's subscribed terminal number by performing authentication processing designed to identify personal information from among registered biological information and performs, based on this number, position registration of a cellular phone to be used with an exchange from the server, thus allowing even a cellular phone different from a phone having a subscriber telephone number to originate and receive calls using the user's subscribed telephone number.

Even a different cellular phone can be made available for use to the user as his or her subscribed cellular phone by simply inputting the user's fingerprint through touching the phone, thus allowing instantaneous switching between a plurality of cellular phones.

Cellular phone personal information is managed by a server constructing an authentication office, preventing possible personal information leaks even in the event of a cellular phone theft.

The position registering method of the present invention may further comprise a use renouncement notification step, by a use renouncement notification unit, of notifying a terminal equipment which has been used so far of renouncement of its use when position information registration is requested of the exchange which enables call in and call out as a terminal equipment having the subscribed terminal number based on authentication of biological information from a new terminal equipment by the authentication request receiving step, the biological information authentication step and the position registration proxy step. This allows the user to confirm that the terminal equipment such as cellular phone which he or she has used previously is no longer available for use.

Biological information received in an authentication request receiving unit is biological information loaded in real time into the terminal equipment. Therefore, biological information such as fingerprint required for position registration authentication will not remain in the terminal equipment, thus eliminating the likelihood of biological information piracy even in the event of a theft of the cellular phone or other terminal equipment.

The personal information management step may include registering charged user identification information of a specific person among group members as common charged user identification information in personal information of a plurality of terminal equipments owned by group members such that the specific person is charged.

Thus, linking personal information—information identified by authentication of biological information of cellular phones or other terminal equipments possessed by group members such as family members—and a specific charged user identity together allows all calls to be charged to a specific user if group members make calls using position registration based on biological information authentication by a server.

Here, the terminal equipments used in the present invention are cellular phones. Biological information employed in the present invention includes user's fingerprints, venous vascular network, palm print, palm shape, facial image, ear shape or iris.

According to a second aspect of the present invention there is provided a program executed by a server which is accessible to a terminal equipment and an exchange. The program allows a computer acting as the server to execute:

a personal information managing step of registering personal information for each user, the personal information linking a subscribed terminal number, a terminal subscriber identification number and user charging identification information to biological information of a user possessing the terminal equipment;

an authentication request receiving step of receiving from the terminal equipment an authentication request containing the user biological information and the terminal subscriber identification information;

a biological information authentication step of retrieving personal information having biological information matching the received biological information and of changing terminal subscriber identification information in the retrieved personal information into the received terminal subscriber identification information; and a position registration proxy step of transferring the subscribed terminal number in the personal information retrieved and the received terminal subscriber identification information to an exchange and of requesting position information registration which enables call in and call out as a terminal equipment having the subscribed terminal number.

According to a third aspect of the present invention there is provided an apparatus for registering the position of a terminal equipment. The position registration apparatus (server) comprises:

a personal information managing unit for registering personal information for each user, the personal information linking a subscribed terminal number, a terminal subscriber identification number and user charging identification information to biological information of a user possessing the terminal equipment;

an authentication request receiving unit for receiving from the terminal equipment an authentication request containing the user biological information and the terminal subscriber identification information;

a biological information authentication unit for retrieving personal information having biological information matching the received biological information and of changing terminal subscriber identification information in the retrieved personal information into the received terminal subscriber identification information; and a position registration proxy unit for transferring the subscribed terminal number in the personal information retrieved and the received terminal subscriber identification information to an exchange and of requesting position information registration which enables call in and call out as a terminal equipment having the subscribed terminal number.

Note that the details of the program and the position registration apparatus of the present invention are basically the same as those of the position registration method.

The above and other objects, aspects, features and advantages of the present invention will become more apparent from the following detailed description with reference to the drawings.

BRIEF DESCRIPTION OF THE DRAWINGS

FIGS. 3A and 3B are block diagrams showing the functional configuration of a server constructing a biological authentication office shown in FIG. 2 together with a cellular phone and a mobile communication exchange;

FIGS. 7A and 7B are a timing chart of position registration processing by biological information authentication of the present invention;

FIG. 11 is an explanatory diagram of contents registered in a personal information database which charges a specific person in a group.

DESCRIPTION OF THE PREFERRED EMBODIMENT

Figure 1A:
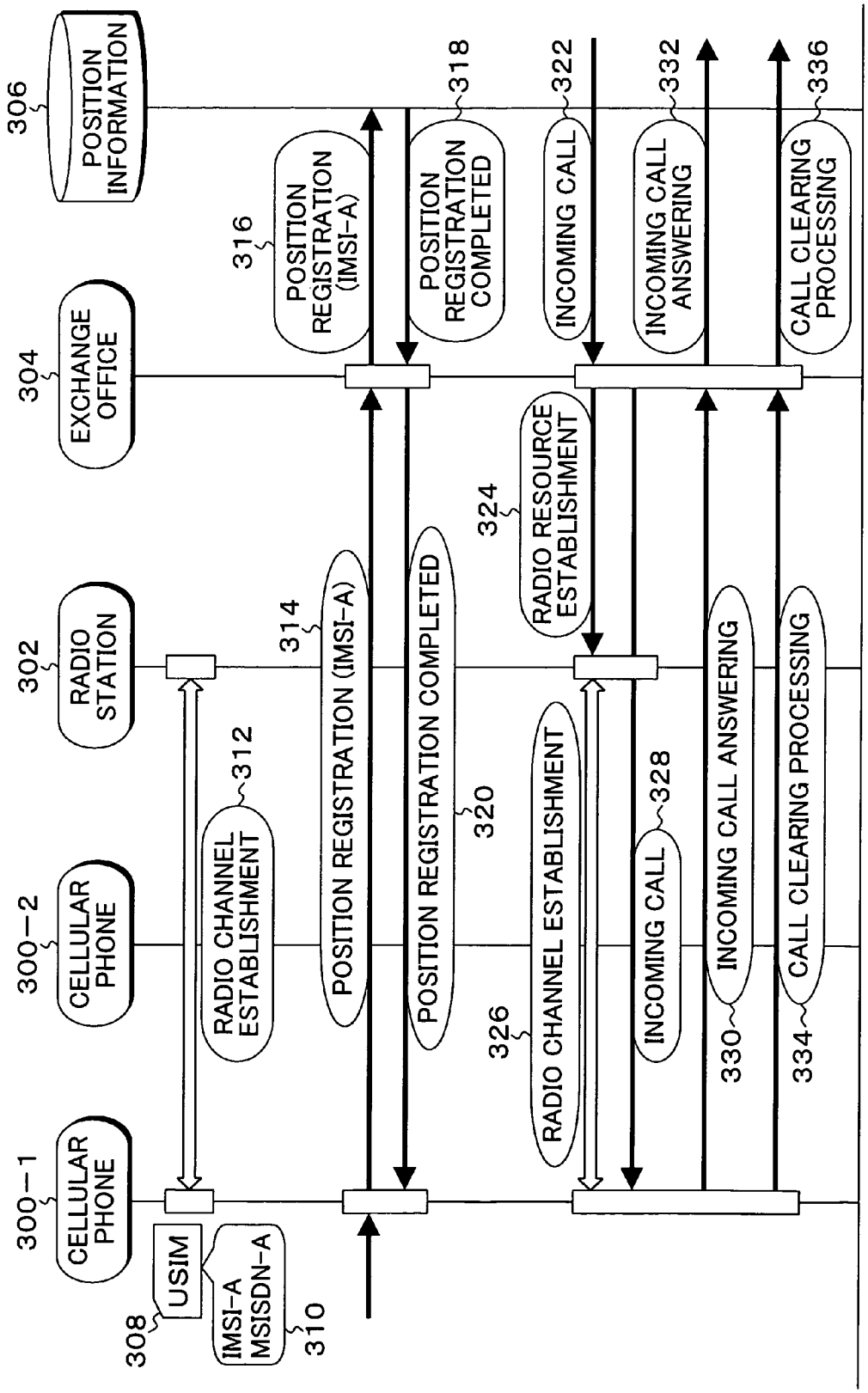
FIGS. 1A and 1B are timing charts of conventional position registration processing using IC card.
Figure 1B:
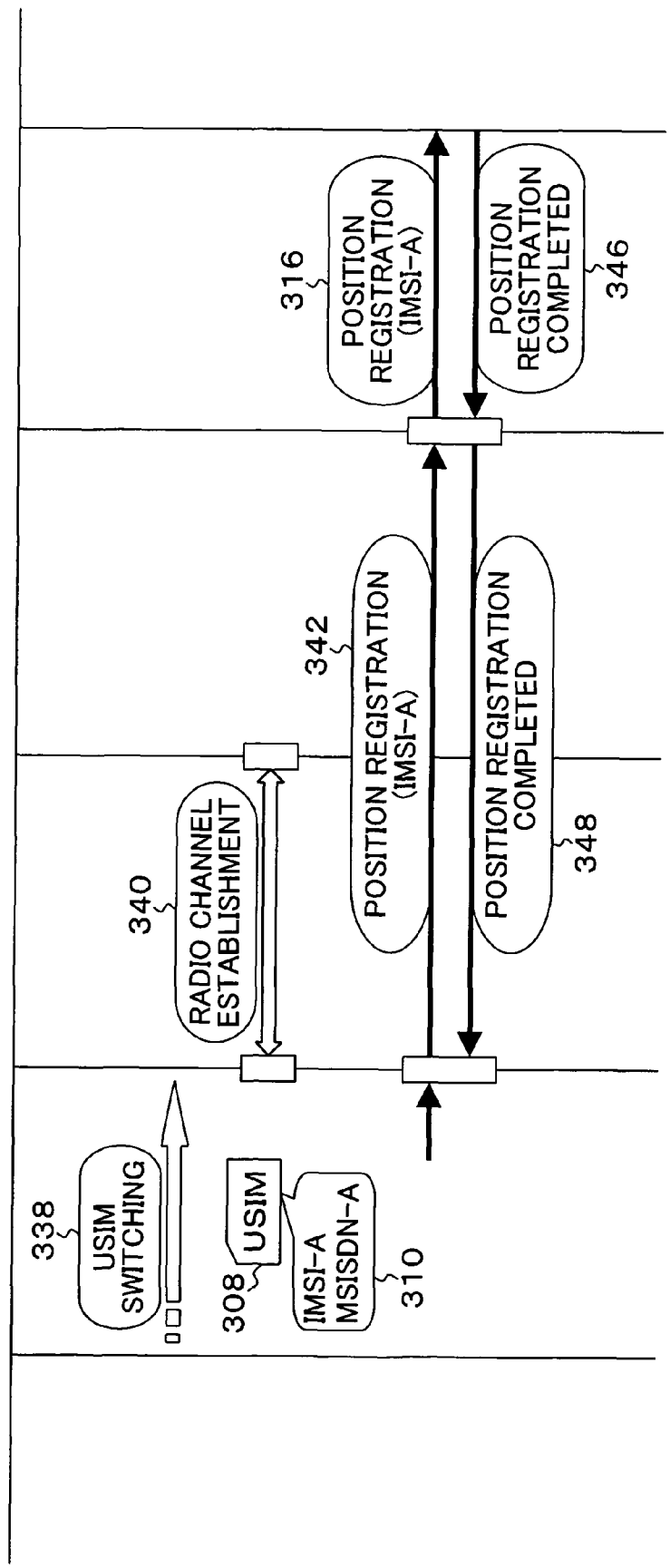
Figure 2:
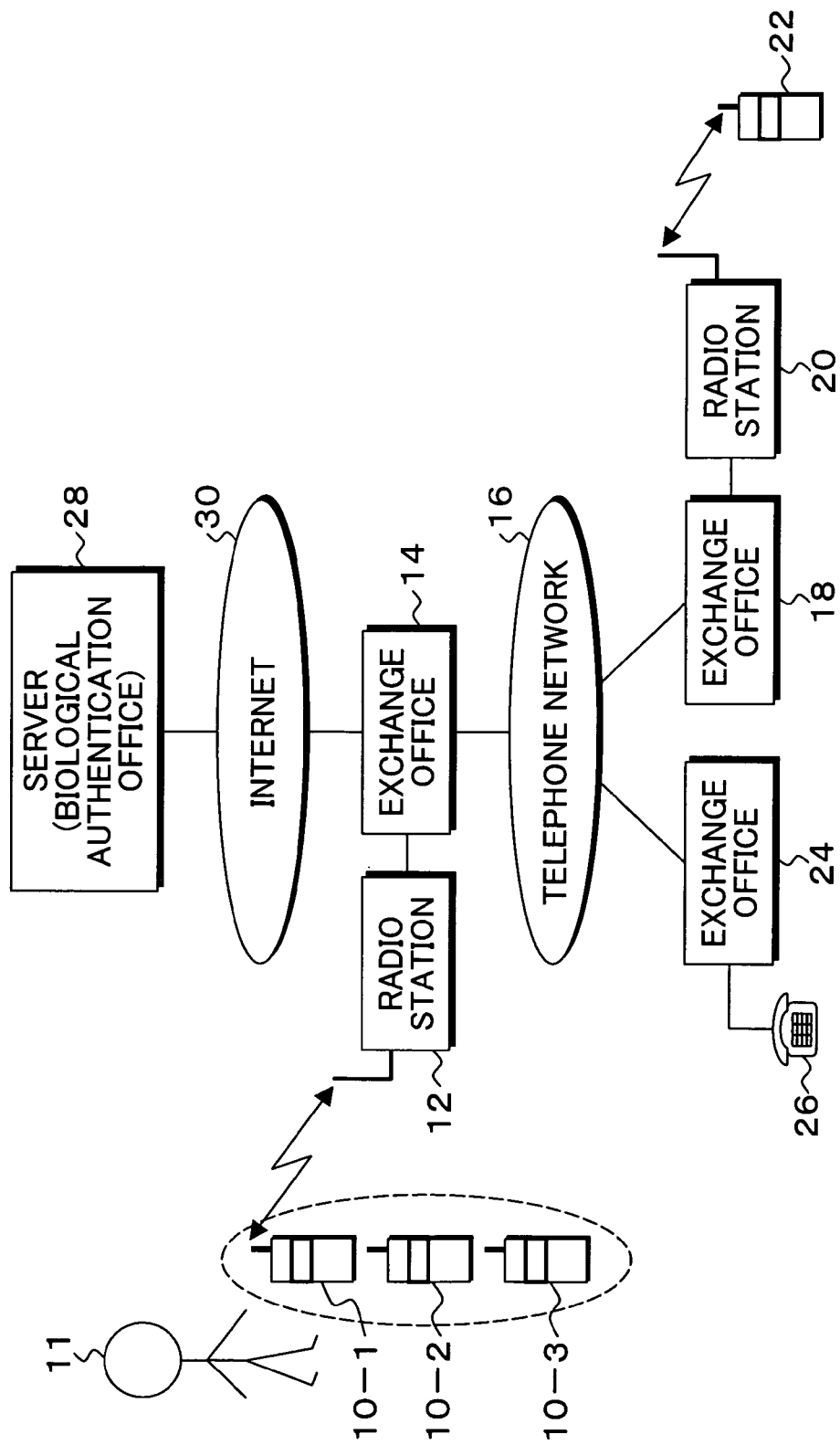
FIG. 2 is an explanatory diagram of a network environment to which the present invention is applied.

FIG. 2 illustrates an explanatory diagram of a network environment to which the present invention is applied, taking, as examples of terminal equipments, cellular phones.

In FIG. 2, cellular phones 10-1, 10-2 and 10-3 functioning as terminal equipments are all used by a user 11 alone. The user 11 has a subscriber telephone number for the cellular phone 10-1, but the cellular phones 10-2 and 10-3 are, for example, borrowed phones with no such numbers.

The user 11 can normally use the cellular phone 10-1 having a subscriber telephone number to make calls with a cellular phone 22 owned by other user via a radio station 12, a mobile communication exchange 14, a telephone network 16, a mobile communication exchange 18 and a radio station 20 or with a fixed phone 26 connected to a fixed communication exchange 24.

Thus, a server 28 is provided which functions as a biological authentication office via an Internet 30, for example, to allow the user 11 to use any of the three cellular phones 10-1 to 10-3. Biological information of the user 11 such as fingerprint information linked to personal information of the cellular phone 10-1 is registered in advance in the server 28.

For this reason, if the user 11 uses the cellular phone 10-1, this phone reads the fingerprint image of the user 11 with its fingerprint read sensor and sends it to the server 28 to request authentication. In response to the authentication request, the server 28 identifies the personal information of the user 11 by the biological information sent from the cellular phone 10-1 and registers position information with the mobile communication exchange 14 to make the cellular phone 10-1 available for use.

Figure 3A:
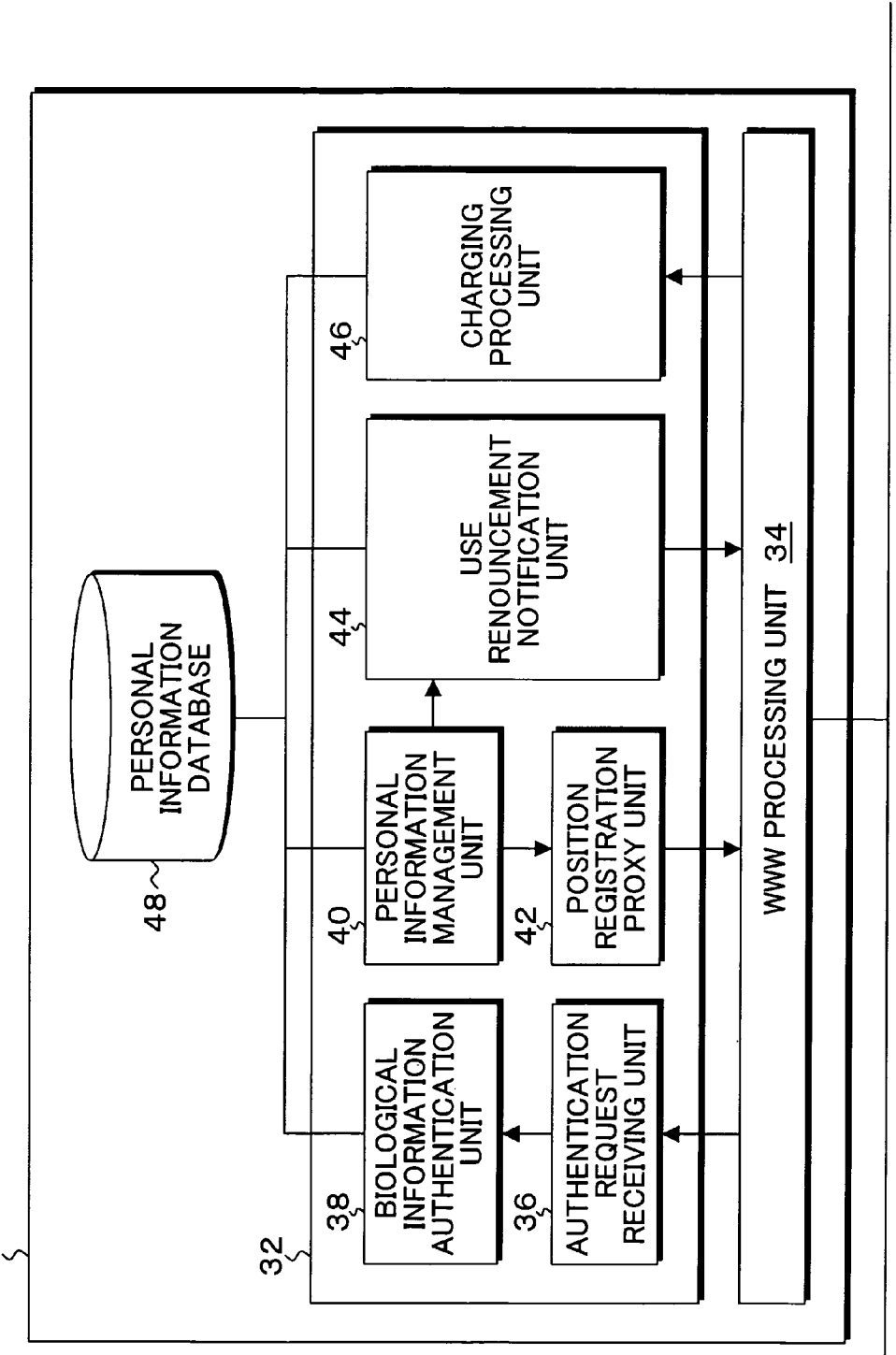

FIGS. 3A and 3B illustrate a functional configuration of the server 28 constructing the biological authentication office shown in FIG. 2 together with the cellular phone 10-1 and the mobile communication exchange 14.

An authentication processing unit 32 and a WWW processing unit 34 are provided in the server 28. An authentication request receiving unit 36, a biological information authentication unit 38, a personal information management unit 40, a position registration proxy unit 42, a use renouncement notification unit 44 and a charging processing unit 46 are provided in the authentication processing unit 32 while a personal information database 48 is provided for the authentication processing unit 32.

On the other hand, the cellular phone 10-1 is provided with a fingerprint read sensor 50 which reads, for example, fingerprint images as biological information. Placing a finger on the read window 50 of the fingerprint read sensor allows fingerprint information to be read and sent to the server 28 for biological information authentication.

The mobile communication exchange 14 is provided with a position registration processing unit 54 which, upon request from the position registration proxy unit 42 of the server 28, registers position information 56 to make the cellular phone available for use.

Figure 4:
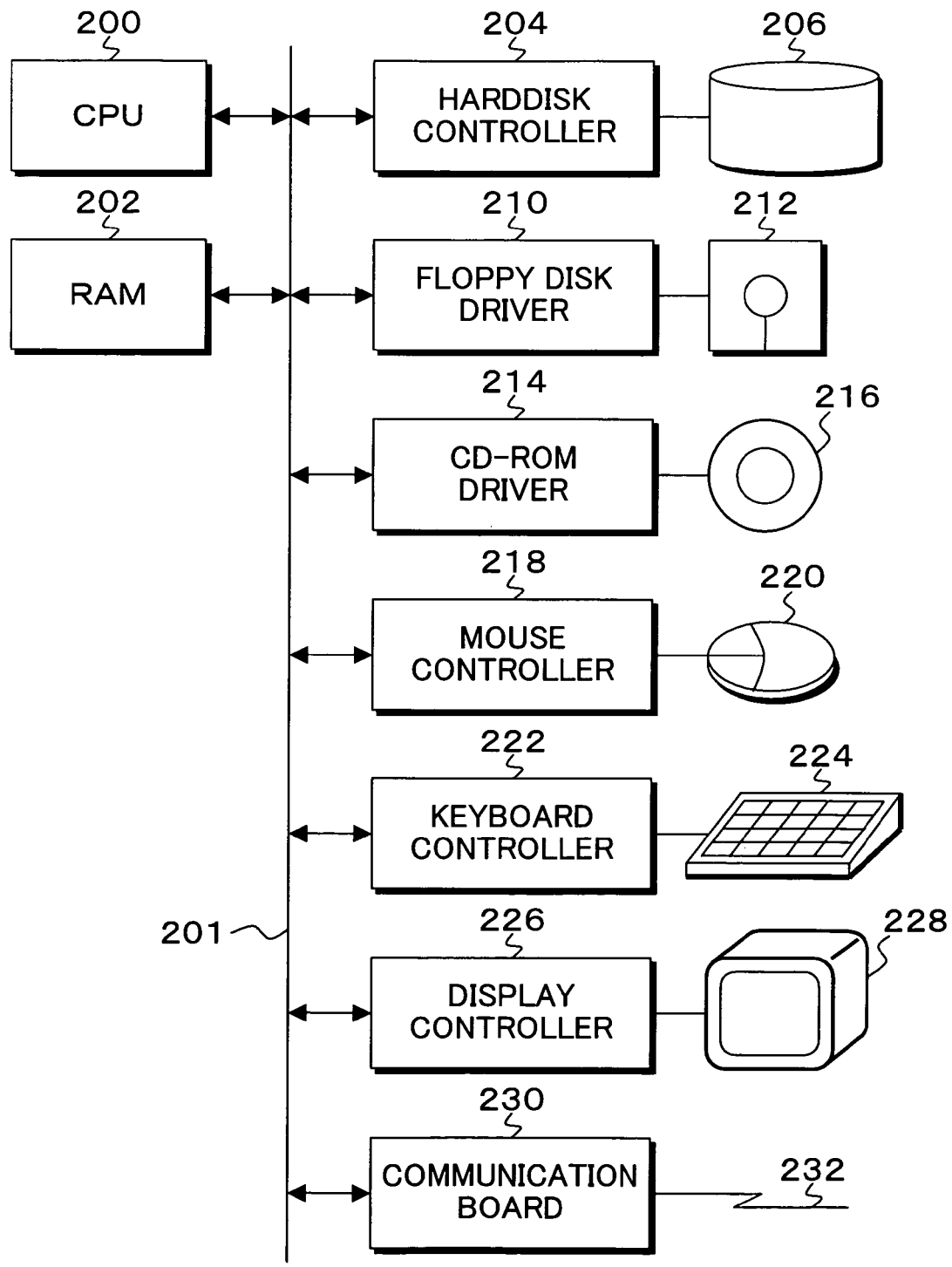
FIG. 4 is an explanatory diagram of a computer hardware environment used for the server in FIGS. 3A and 3B.

The server 28 in FIGS. 3A and 3B is implemented, for example, using computer hardware resources shown in FIG. 4.

In the computer shown in FIG. 4, a RAM 202, a hard disk controller (software) 204, a floppy disk driver (software) 210, a CD-ROM driver (software) 214, a mouse controller 218, a keyboard controller 222, a display controller 226 and a communications board 230 are connected to a bus 201 of a CPU 200.

The hard disk controller 204, connecting to a hard disk drive 206, is preloaded with an application program which performs terminal equipment position registration processing of the present invention, invokes necessary programs from the hard disk drive 206 at the computer startup, copies them into the RAM 202 and run them by the CPU 200.

A floppy disk drive (hardware) 212 is connected to the floppy disk driver 210 to allow a floppy disk (R) to be read from or written to. A CD drive (hardware) 216 is connected to the CD-ROM driver 214 to allow data and programs to be loaded from a CD.

The mouse controller 218 informs the CPU 200 of input operations performed with a mouse 220. The keyboard controller 222 informs the CPU 200 of input operations performed with a keyboard 224. The display controller 226 displays information on a display unit 228. The communications board 230 uses communications circuits 232 including radio circuits to communicate with other computers and servers via networks such as the Internet.

Next, the processing capability of the server 28 functioning as the biological authentication office in FIGS. 3A and 3B will be described in detail. First, the personal information database 48 of the server 28 has personal information 58 with a record format as shown in FIG. 5 registered in advance for each user.

The personal information 58 contains biological information 60 such as fingerprint image, a subscriber telephone number 62 of the cellular phone owned by a user, personal data 64 such as user phone book, an international mobile subscriber identification number (IMSI) 66—a number used to access the cellular phone from the mobile communication exchange 14—and a charged user identification number 68. The personal information 58 is registered with the personal information database 48 by the personal information management unit 40.

The authentication request receiving unit 36 receives an authentication request containing the user biological information from the cellular phone 10-1 and the international mobile subscriber identification number (IMSI) and outputs reception information to the biological information authentication unit 38.

Figure 5:
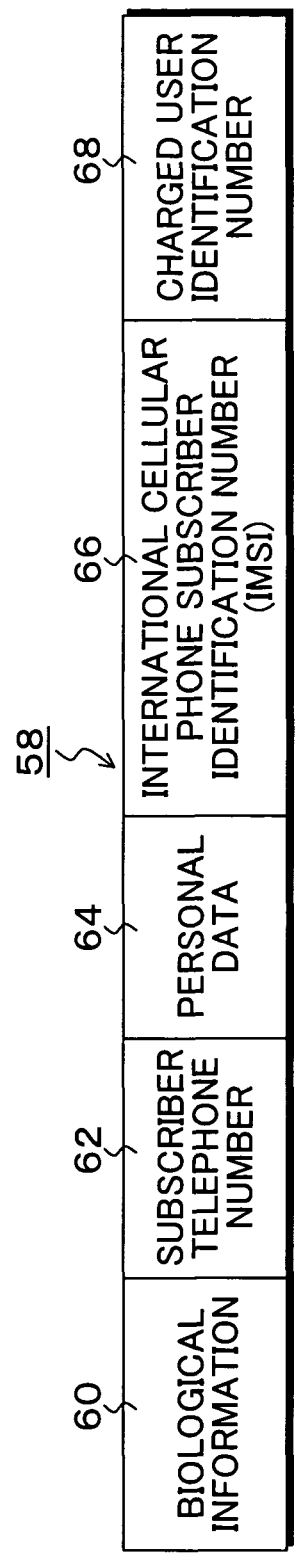
FIG. 5 is an explanatory diagram of the record format of a personal information database shown in FIGS. 3A and 3B.

The biological information authentication unit 38 searches the personal information database 48 by user biological information received by the authentication request receiving unit 36 such as fingerprint image information, finds registered biological information which matches the received biological information to identify the personal information 58 as shown in FIG. 5 and records the received international mobile subscriber identification number of the cellular phone in the field of the international mobile subscriber identification number (IMSI) 66 in the identified personal information 58.

Further, the position registration proxy unit 42 transfers the subscriber telephone number 62 and the received international mobile subscriber identification number (IMSI) in the personal information 58 identified by the biological information to the mobile communication exchange 14 to request that the two numbers be registered by the position registration processing unit 54 as the position information 56, thus allowing the cellular phone to receive and originate calls as a phone having a subscriber cellular phone number.

Figure 6:
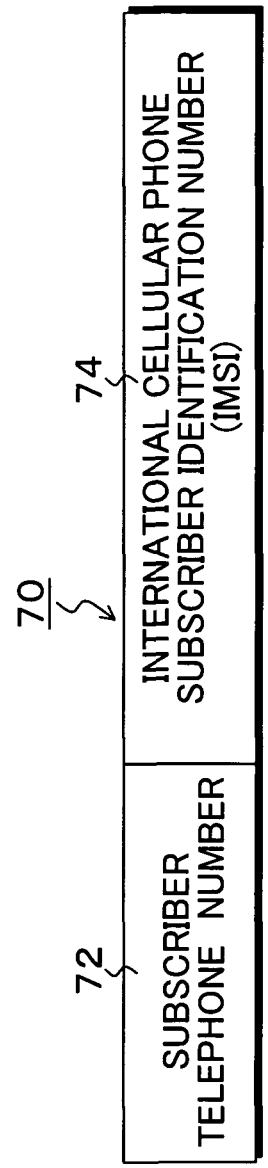
FIG. 6 is an explanatory diagram of the record format of position information whose setup is requested to the exchange in FIGS. 3A and 3B.

FIG. 6 illustrates a record format 70 of the position information 56 registered by the position registration processing unit 54 of the exchange 14 in response to the request from the server 28. A subscriber telephone number 72 and an international mobile subscriber identification number (IMSI) 74 are linked together and registered. Although the position information 56 is normally registered by a cellular phone when the phone begins to be used, the server 28, which received an authentication request from the cellular phone, registers the position information on behalf of the cellular phone in the present invention.

FIGS. 7A and 7B illustrate a timing chart showing a specific processing procedure for cellular phone position registration by authentication processing using biological information according to the present invention. This example shows a processing assuming that the user 11 switches, by registering position information through biological authentication, to the cellular phone 10-2 which is, for example, a borrowed phone from the cellular phone 10-1 having a subscriber telephone number after he or she has started using the latter phone.

In FIGS. 7A and 7B, the user first performs position registration through authentication of biological information using his or her cellular phone 10-1 in order to start using the cellular phone 10-1 having a subscriber telephone number.

Position registration of the cellular phone 10-1 is conducted by first performing a radio channel establishment 76 between the cellular phone 10-1 and the radio station 12, reading a fingerprint 78 placed on the fingerprint read sensor of the cellular phone 10-1 and sending the read fingerprint image information and the international mobile subscriber identification number (IMSI-A) to the server 28 which functions as the biological authentication office for an authentication registration 80.

In response to the authentication request from the cellular phone 10-1, the server 28 finds a registered fingerprint image matching the received fingerprint image and identifies personal information through search of the personal information database 48.

Then, identified personal information such as the subscriber telephone number 62 obtained from the personal information 58 and the international mobile subscriber identification number (IMSI-A) received from the cellular phone 10-1, both numbers shown in FIG. 5, are sent to the exchange 14 to request a position registration 82.

In response to a request for the position registration 82 from the server 28, the exchange 14 performs a position registration 84 of the position information 56 of the cellular phone 10-1 in the position information 56. When the position registration 84 is complete, the server 28 is notified of a position registration completion 88 while the exchange 14 is notified of a position registration completion 86. Further, the exchange 14 notifies the cellular phone 10-1 of a position registration completion 90. This allows the cellular phone 10-1 to originate and receive calls using the subscriber telephone number.

For instance, if the exchange 14 receives an incoming call 92 from a terminal equipment such as other cellular phone, a radio resource establishment 94 is performed between the exchange 14 and the radio station 12 first followed by a radio channel establishment 96 between the radio station 12 and the cellular phone 10-1, after which the cellular phone 10-1 receives an incoming call 98 from the exchange 14.

When the cellular phone 10-1 sends an incoming call acknowledge 100 to the exchange 14 in response to the incoming call 98, an incoming call acknowledge 102 is sent to the originating side such as a cellular phone via the exchange 14. Then, when the call ends on the cellular phone 10-1, a call clearing processing 104 is sent to the exchange 14. Further, the exchange 14 notifies the originating side of a call clearing processing 106.

Next, we suppose that the user wishes to stop using the cellular phone 10-1 which he or she has used previously and start using the cellular phone 10-2 which is, for example, a borrowed phone. In this case, a radio channel establishment 108 is performed first between the cellular phone 10-2 and the radio station 12. Then, the user places his or her finger on the fingerprint read sensor of the cellular phone 10-2 in the same manner as for authentication of the cellular phone 10-1 to allow the sensor to read the same fingerprint 78 such that an authentication registration 112 is requested from the cellular phone 10-2 to the server 28. The fingerprint 78 and the international mobile subscriber identification number (IMSI-B) of the mobile phone 10-2 are sent for the purpose of the authentication registration 112.

In response to the request for the authentication registration 112 from the cellular phone 10-2, the server 28 identifies the personal information 58 having the matching registered fingerprint image, for example, as that shown in FIG. 5 through search of the personal information database 48 by fingerprint image as biological information.

Then, the server 28 transfers the subscriber telephone number 62 contained in the identified personal information 58 and the international mobile subscriber identification number (IMSI-B) received from the cellular phone 10-2 to the exchange 14 to request a position registration 114.

In response to the request for the position registration from the server 28, the exchange 14 performs a position registration 116 of the subscriber telephone number contained in the personal information identified by the personal information database by biological information and the international mobile subscriber identification number of the cellular phone 10-2 in the position information 56. The exchange 14 notifies the server 28 of a position registration completion 120 while the server 28 notifies the exchange 14 of a position registration completion 118. Further, the exchange 14 notifies the cellular phone 10-2 of a position registration completion 122.

Thus, when position registration is complete which allows the cellular phone 10-2 to receive and originate calls using the subscriber telephone number, the server 28 sends a use renouncement notification 124 to the previously used cellular phone 10-1 to notify the user that the cellular phone 10-1 is no longer available for use.

Of course, if the user wishes to switch back to the original cellular phone 10-1 after having switched once to the cellular phone 10-2, he or she can do so by performing position registration which allows the cellular phone 10-1 to originate and receive calls through sending of the image of the fingerprint 78 from the cellular phone 10-1 to the server 28 for biological authentication as the user did previously. Further, the user can switch to other cellular phone different from the cellular phone 10-2 in the same manner.

Figure 8A:
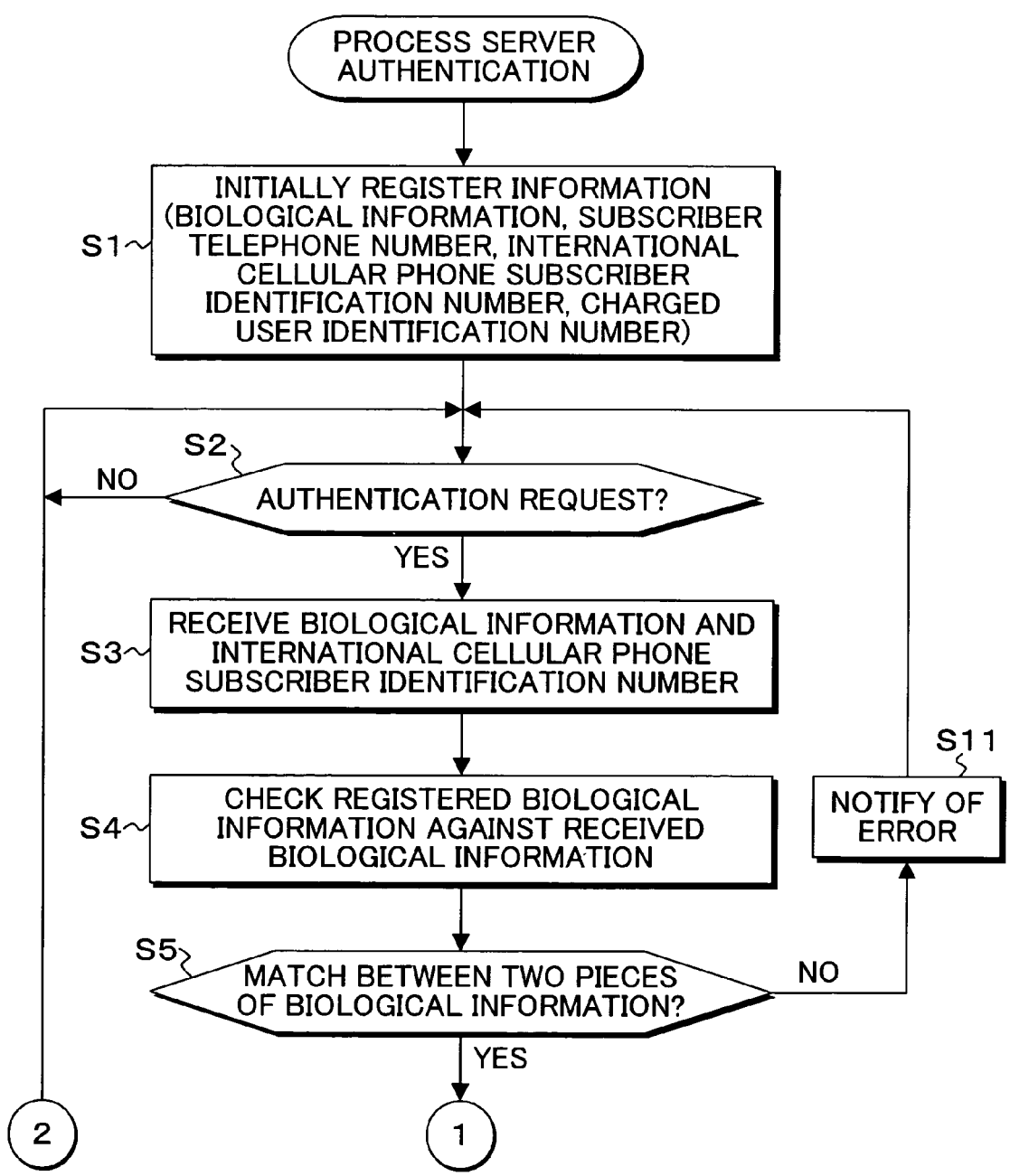
FIGS. 8A and 8B are flowcharts of server authentication processing shown in FIGS. 3A and 3B.
Figure 8B:
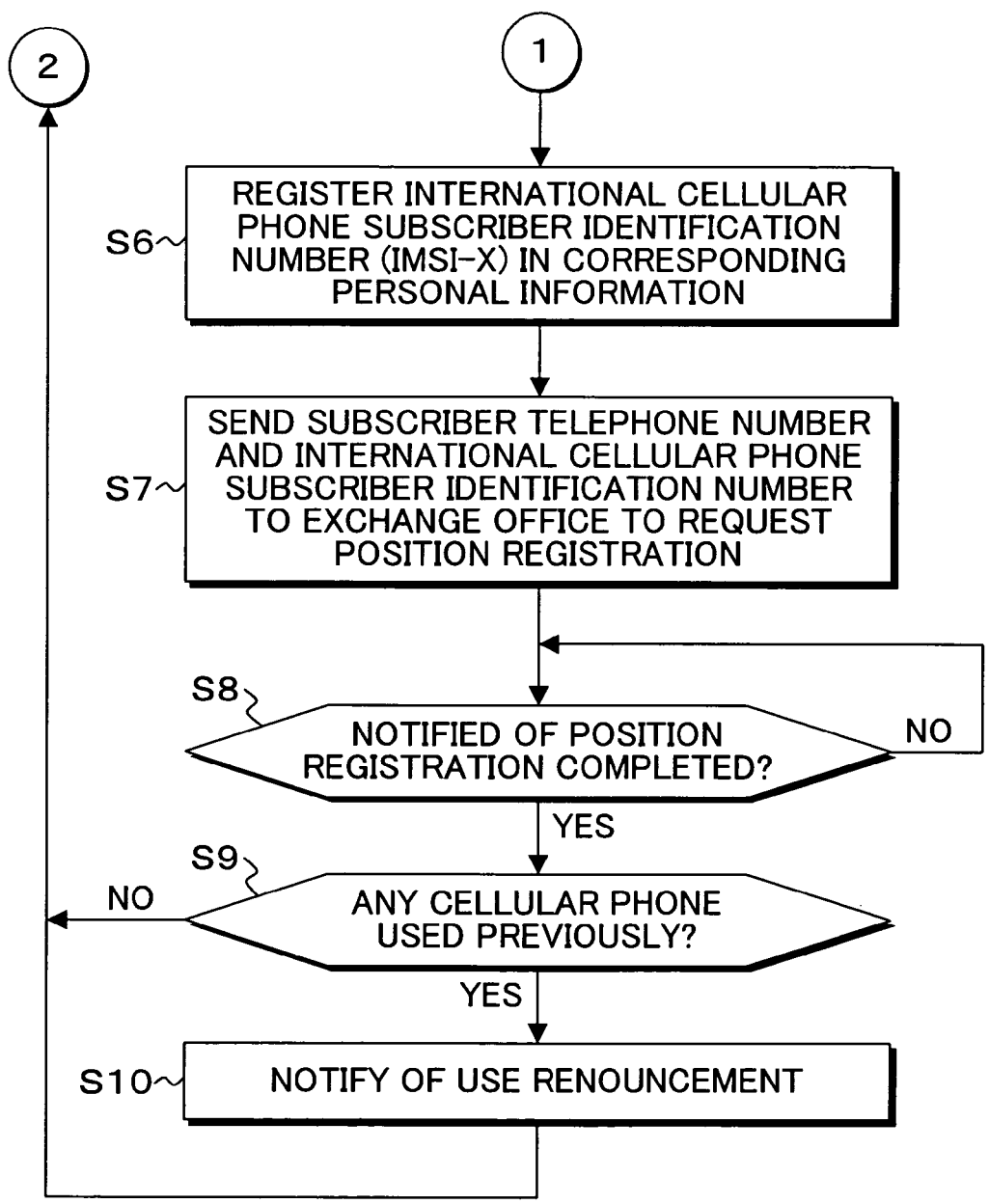

FIGS. 8A and 8B illustrate a flowchart showing the procedure for authentication processing by the server 28 shown in FIGS. 3A and 3B. The flowchart concurrently provides the details of the program of the server functioning as the biological authentication office.

In FIGS. 8A and 8B, personal information is registered initially with the personal information database 48 in step S1. This initial registration of personal information is designed to link together biological information, a subscriber telephone number, an international mobile subscriber identification number and a charged user identification number for registration of such information in a position record format for each user. For initial registration, an international mobile subscriber identification number need not always be registered and may be left blank.

Next, whether an authentication request has been made by the cellular phone is checked in step S2. If a request has been made, the server receives biological information and an international mobile subscriber identification number (MISI-X) from the cellular phone in step S3 and checks the biological information registered with the personal information database against the received biological information in step S4.

If there is a match between the two pieces of the biological information in step S5, the server registers the international mobile subscriber identification number (MISI-X) received from the cellular phone in the corresponding personal information in step S6. Then, the server sends the subscriber telephone number and the international mobile subscriber identification number (IMSI-X) to the exchange to request position registration in step S7.

If, in response to the request for position registration, the exchange notifies the server of position registration completion in step S8, the server checks whether any cellular phone has been previously used in step S9. If a cellular phone has been previously used, the server sends a use renouncement notification to the cellular phone in step S10.

If the received biological information does not match the registered one in step S5, the server notifies the cellular phone of an error in step S11 and waits for a new authentication request in step S12.

Figure 9:
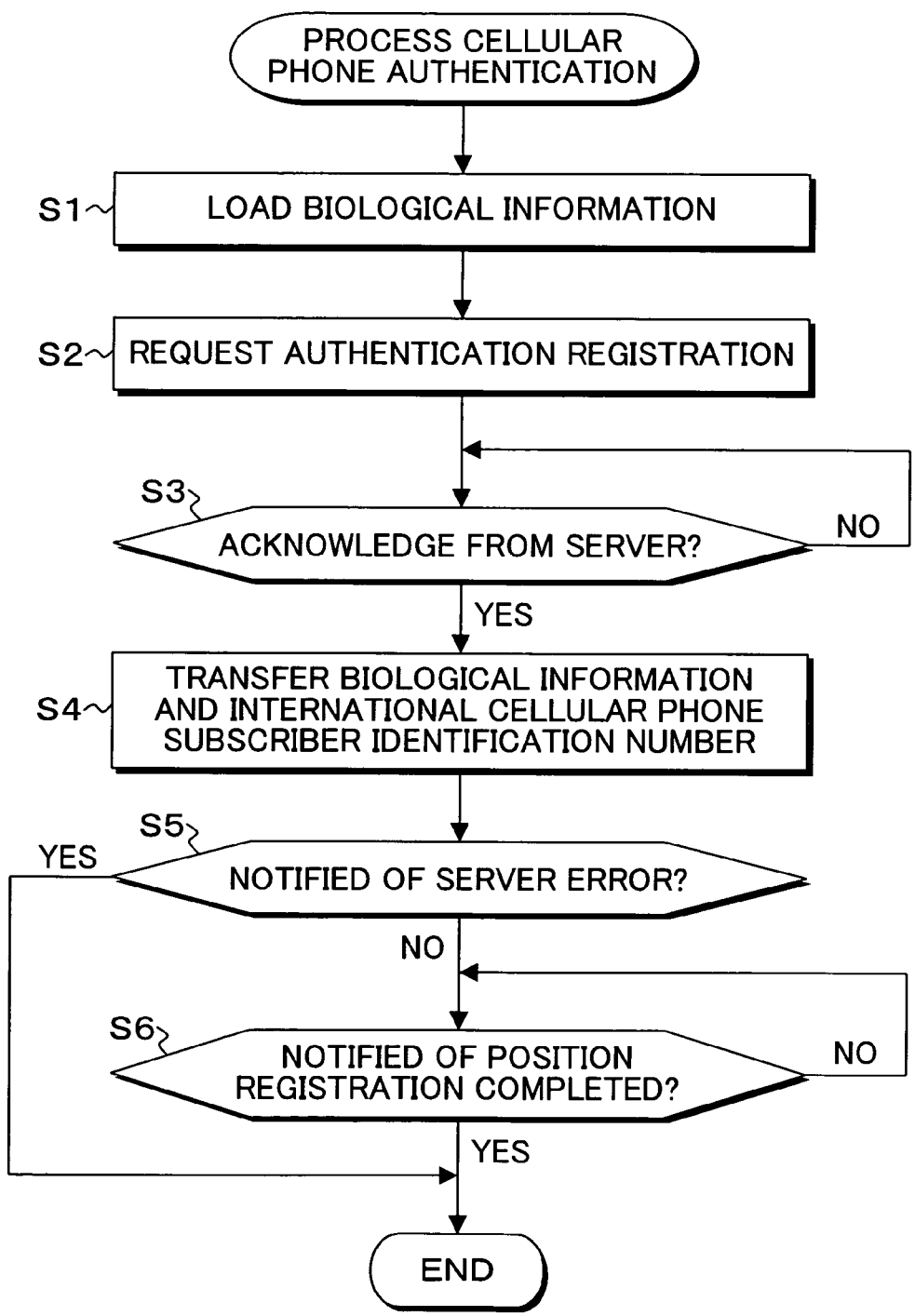
FIG. 9 is a flowchart of authentication processing in cellular phone shown in FIGS. 3A and 3B.

FIG. 9 illustrates a flowchart of authentication processing by the cellular phone for cellular phone position registration according to the present invention. In the cellular phone authentication processing, the cellular phone reads biological information such as fingerprint image in step S1 and requests authentication registration to the server 28 in step S2.

If the cellular phone receives an acknowledge from the server in step S3, the cellular phone transfers biological information and its international mobile subscriber identification number (IMSI-X) in step S4. Then, if the cellular phone is not notified of an error by the server in step S5, it waits for position registration completion from the exchange in step S6, thus terminating a series of processings.

Figure 10:
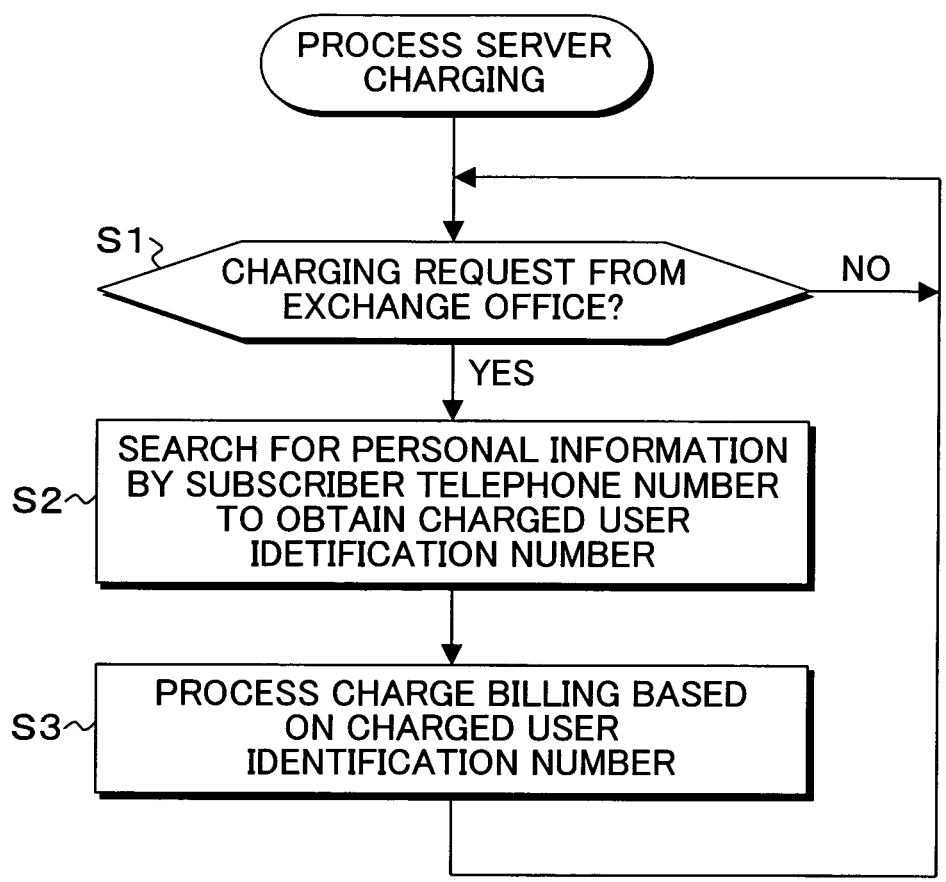
FIG. 10 is a flowchart of server charging processing shown in FIGS. 3A and 3B.

FIG. 10 illustrates a flowchart of charging processing by the server 28 functioning as the biological authentication office of the present invention. In the charging processing, if the server 28 receives a charging request from the exchange 14 in step S1, the server 28 searches the personal information database 48 by a subscriber telephone number identified by the charging request and identifies personal information in step S2. Then, the server 28 obtains a charged user identification number of the identified personal information. Finally, the server 28 processes charge billing based on the obtained charged user identification number in step S3.

FIG. 11 illustrates an example of registration with the personal information database 48 for consolidating all charges onto a specific person among group members in the server charging processing shown in FIG. 10.

The personal information database 48 has, for example, four pieces of personal information 58-1, 58-2, 58-3 and 58-4 on four users registered separately. The pieces of information 58-1, 58-2, 58-3 and 58-4 respectively contain pieces of biological information A, B, C and D different from one another on the four users, together with different subscriber telephone numbers of their respective cellular phones and different international mobile subscriber identification numbers (IMSI) (IMSI-A, B, C, D).

As for charged user identification number, a charged user identification number (AAAAA) is registered in all the pieces of personal information 58-1 to 58-4 which specifies the user having the personal information 58-1 as the charged user.

Such a registration with the personal information database 48, as shown in FIG. 11, allows identification of the pieces of personal information 58-1 to 58-4 if a charging request is received from the exchange 14 which identifies the subscriber telephone numbers of the respective pieces of personal information 58-1 to 58-4, and allows all the four cellular phone charges to be billed to the same charged user since the charged user identification number in all the pieces of personal information is "AAAAA" in this case.

While GSM, WCDMA, CDMA-ONE, CDMA2000, PDC, PHS and WLAN terminals, each different from the others in network system, are among terminal equipments which allow position information registration by biological information authentication of the present invention, position registration by biological information authentication of the present invention allows users to use such a plurality of terminal equipments differing in network system using their own subscriber telephone numbers, with charges billed to the subscriber telephone numbers.

While the above embodiment took read fingerprint image as an example of biological information, venous vascular network, palm print, palm shape, facial image, ear shape and iris are among other biological information which can be used as appropriate.

The present invention is not limited to the aforementioned embodiments, but may include any modifications as appropriate without detriment to its object or advantages. Further, the present invention is not limited to the numerical values shown in the aforementioned embodiments.

The present invention, as described above, identifies a subscribed telephone number as a user's subscriber terminal number by sending biological information, read from the input device of a terminal equipment such as cellular phone, to a server and performing authentication processing to identify personal information from registered biological information and then performs, based on this information, position registration of a terminal equipment to be used from the server to an exchange, thus allowing the user to originate and receive calls using a cellular phone different from the one having the subscriber telephone number, with calls charged to the telephone number subscribed by the user.

The user can also use a different cellular phone as the phone having his or her subscriber telephone number by simply touching the phone and inputting the fingerprint, thus allowing instantaneous switching between a plurality of cellular phones.

Since cellular phone personal information is managed by a server constructing a biological authentication office, personal information leaks can be reliably prevented, for example, through cancellation control of personal information on the server side even in the event of a phone theft.

Further, if a plurality of cellular phones are used by individual members of a family or other group, use of the charged user identification number of a specific person—a number included in personal information—as the common number for all members allows all cellular phone charges to be consolidated onto the specific person.

What is claimed is:

1. A method of registering a position of a wireless terminal equipment for permitting call in and call out, comprising:
    registering, in a database of an authentication server, personal information, the personal information linking a subscribed telephone number, first terminal identification information for the first wireless terminal equipment and user charging identification information, to biological information of a user possessing the first wireless terminal equipment;
    wherein the registering of the personal information further comprises linking the registered personal information for said user possessing the first wireless terminal equipment, the first terminal identification information, and the user charging identification information, to a common chargeable user identity for a plurality of users in a group, the common chargeable user identity being charged when a group user calls using position registration based on biological information authentication request received by the authentication server from a wireless terminal equipment of said group;
    transferring, by the authentication server, the subscribed telephone number and said first terminal identification information from the authentication server to an exchange, which allows communication with the first wireless terminal equipment, to request registration of position information permitting call in and call out of said first wireless terminal equipment by said subscribed telephone number;
    receiving, by the authentication server, an authentication request from a second wireless terminal equipment containing the biological information of said user and second terminal identification information for the second wireless terminal equipment;
    updating, by the authentication server, personal information of the user corresponding to the received biological information and the common chargeable user identity by changing the first terminal identification information into the received second terminal identification information;
    transferring, by the authentication server, the subscribed telephone number and the changed second terminal identification information in the updated personal information from the authentication server to an exchange, which allows communication with the second wireless terminal equipment, and requesting position information registration permitting call in and call out of said second wireless terminal equipment using the subscribed telephone number;
    notifying said first wireless terminal equipment of renouncement of the first wireless terminal equipment use when the position information registration for the second wireless terminal is requested of an exchange to enable call in and call out by the second wireless terminal equipment using the subscribed telephone number based on authentication of biological information from said second wireless terminal equipment, the second wireless terminal equipment is to be switched systematically from the first wireless terminal equipment under use, and the first wireless terminal equipment automatically becomes unusable;
    wherein the biological information of the user contained in the authentication request received by the authentication server is biological information of the user read into real time in the second wireless terminal equipment.

2. The method of registering the position of a wireless terminal equipment according to claim 1, wherein the wireless terminal equipment is a cellular phone.

3. The method of registering the position of a wireless terminal equipment according to claim 1, wherein the biological information is a fingerprint, venous vascular network, palm print, palm shape, facial image, ear shape or iris.

4. A non-transitory computer readable storage medium storing a program executed by a computer acting as an authentication server that is accessible between wireless terminal equipments and an exchange to permit call in and call out, to perform operations comprising:
    registering, in a database of the authentication server, personal information, the personal information linking a subscribed telephone number, first terminal identification information for the first wireless terminal equipment and user charging identification information to biological information of a user possessing the first wireless terminal equipment;
    wherein the registering of the personal information further comprises linking the registered personal information for said user possessing the first wireless terminal equipment, the first terminal identification information, and the user charging identification information, to a common chargeable user identity for a plurality of users in a group, the common chargeable user identity being charged when a group user calls using position registration based on biological information authentication request received by the authentication server from a wireless terminal equipment of said group;
    transferring, by the authentication server, the subscribed telephone number and said first terminal identification information from the authentication server to an exchange, which allows communication with the first wireless terminal equipment, to request registration of position information permitting call in and call out of said first wireless terminal equipment by said subscribed telephone number;
    receiving, by the authentication server, an authentication request from a second wireless terminal equipment containing the biological information of said user and second terminal identification information for the second wireless terminal equipment;
    updating, by the authentication server, personal information of the user corresponding to the received biological information and the common chargeable user identity by changing the first terminal identification information into the received second terminal identification information;

transferring, by the authentication server, the subscribed telephone number and the changed second terminal identification information in the updated personal information from the authentication server to an exchange, which allows communication with the second wireless terminal equipment, and requesting position information registration permitting call in and call out of said second wireless terminal equipment using the subscribed telephone number;

notifying said first wireless terminal equipment of renouncement of the first wireless terminal equipment use when the position information registration for the second wireless terminal is requested of an exchange to enable call in and call out by the second wireless terminal equipment using the subscribed telephone number based on authentication of biological information from said second wireless terminal equipment, the second wireless terminal equipment is to be switched systematically from the first wireless terminal equipment under use, and the first wireless terminal equipment automatically becomes unusable;

wherein the biological information of the user contained in the authentication request received by the authentication server is biological information of the user read in real time into the second wireless terminal equipment.

5. An authentication server apparatus in communication with an exchange and registering positions of wireless terminal equipments for permitting call in and call out, comprising:

a personal information managing unit registering, in a database, personal information, the personal information linking a subscribed telephone number, a first terminal identification information for the first wireless terminal equipment and user charging identification information to biological information of a user possessing the first wireless terminal equipment;

wherein the registering of the personal information further comprises linking the registered personal information for said user possessing the first wireless terminal equipment, the first terminal identification information, and the user charging identification information, to a common chargeable user identity for a plurality of users in a group, the common chargeable user identity being charged when a group user calls using position registration based on biological information authentication request received by the authentication server from a wireless terminal equipment of said group;

a first position registration proxy unit transferring the subscribed telephone number and said first terminal identification information to an exchange which allows communication with the first wireless terminal equipment to request registration of position information permitting call in and call out of said first terminal equipment by said subscribed telephone number;

an authentication request receiving unit receiving an authentication request from a second wireless terminal equipment containing the biological information of said user and a second terminal identification information for the second terminal equipment;

a biological information authentication unit retrieving personal information of the user corresponding to the received biological information and updating the retrieved personal information and the common chargeable user identity by changing the first terminal identification information into the received second terminal identification information;

a second position registration proxy unit transferring the subscribed telephone number and the changed second terminal identification information in the updated personal information to an exchange which allows communication with the second wireless terminal equipment and requesting position information registration permitting call in and call out of said second wireless terminal equipment using the subscribed telephone number; and a use renouncement notification unit notifying said first wireless terminal equipment of renouncement of the first wireless terminal equipment use when the position information registration for the second wireless terminal equipment is requested of the-an exchange to enable call in and call out by the second wireless terminal equipment using the subscribed telephone number based on authentication of biological information from said second wireless terminal equipment, the second wireless terminal equipment is to be switched systematically from the first wireless terminal equipment under use, and the first wireless terminal equipment automatically becomes unusable, wherein the biological information of the user contained in the authentication request received by the authentication server is biological information of the user read in real time in the second wireless terminal equipment.

* * * * *

UNITED STATES PATENT AND TRADEMARK OFFICE
CERTIFICATE OF CORRECTION

PATENT NO. : 8,423,784 B2
APPLICATION NO. : 10/716397
DATED : April 16, 2013
INVENTOR(S) : Katsuaki Akama It is certified that error appears in the above-identified patent and that said Letters Patent is hereby corrected as shown below:

In the Claims:

Column 12, Line 20, in Claim 1, delete "into real time in" and insert -- in real time into --, therefor.

Column 14, Line 46, in Claim 5, delete "in" and insert -- into --, therefor.

Signed and Sealed this
Twenty-first Day of October, 2014

Michelle K. Lee
*Deputy Director of the United States Patent and Trademark Office*